April 26, 1932. M. MILLER 1,855,252
CORN PLANTER ATTACHMENT FOR TRACTORS
Filed July 2, 1929 2 Sheets-Sheet 1

Fig.1.

April 26, 1932. M. MILLER 1,855,252
CORN PLANTER ATTACHMENT FOR TRACTORS
Filed July 2, 1929 2 Sheets-Sheet 2

Inventor
Mike Miller
per Orwig & Hague Att'ys

Patented Apr. 26, 1932

1,855,252

UNITED STATES PATENT OFFICE

MIKE MILLER, OF SCRANTON, IOWA

CORN PLANTER ATTACHMENT FOR TRACTORS

Application filed July 2, 1929. Serial No. 375,397.

The object of my invention is to provide an attachment for that type of tractors having front steering wheels adapted to travel between two rows of plants, and the tractor wheels spaced apart to permit the said rows to pass between them, the spacing of the tractor wheels being equal to twice the distance between two rows of plants, which attachment is adapted to draw a two row corn planter adjacent to each side of the tractor and in front of each of the tractor wheels in such manner that said planters will independently follow the unevenness of the ground surface, and at the same time check in unison and have the inner runners of said planters operate at a distance apart equal to the spacing between two adjacent rows of plants, so that all of the rows are planted an equal distance apart.

A further object is to provide in connection with a device of the class above described means carried by the tractor for elevating and lowering the planters so that the entire weight of the planters may be carried by the tractor when turning around at the end, or when moving from one field to another.

A further object is to provide in connection with a planter attachment of the class above described means carried by the tractor for independently changing the depth of the runners of one planter relative to those of the other planter, while the planter wheels are in engagement with the ground surface in the usual manner; and further to provide means whereby both of the planters may be elevated entirely above the ground surface.

A further object is to provide in connection with means for drawing a pair of planters by a tractor means for operatively connecting the planters, whereby they will be made to drop in unison and to provide means whereby the planters may be independently elevated and lowered, and at the same time always supported at the proper working distance from each other.

A further object is to provide in a device of the type above described, a single lever mechanism carried by the tractor for first elevating and lowering the runners to vary the depth of the same on the first movement of the lever, and upon further movement of the lever to elevate the entire planter above the ground surface.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a plan view of a tractor frame showing the manner in which my improved device is applied.

Figure 2:
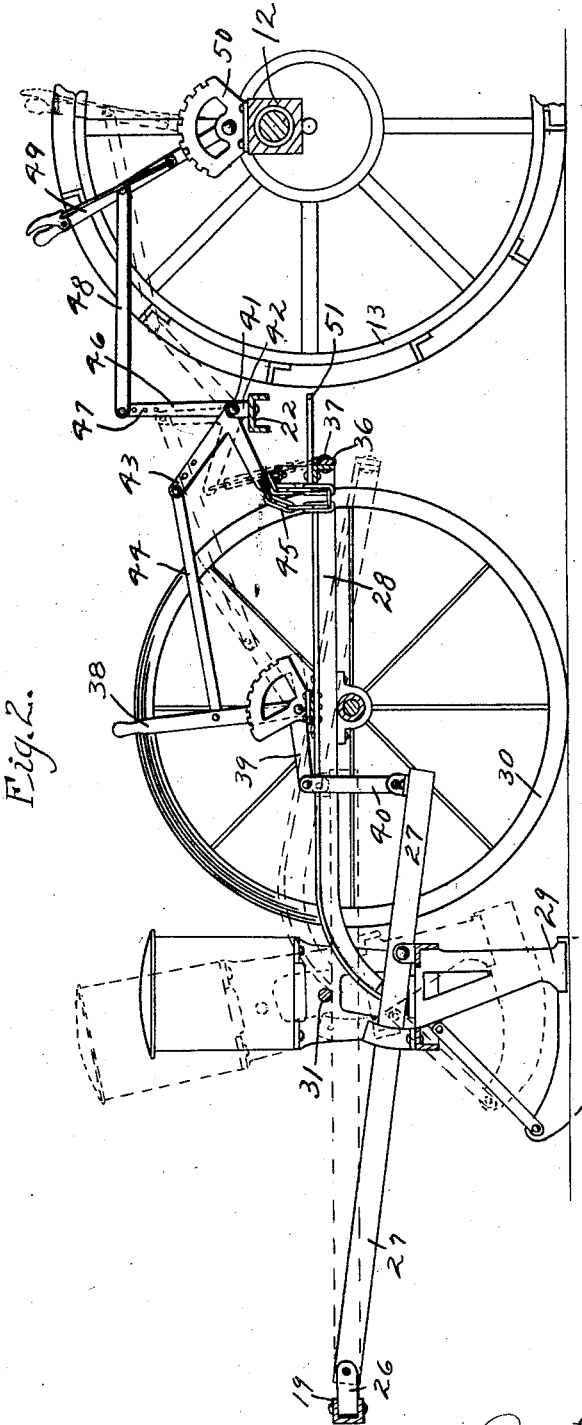
Figure 2 shows an enlarged sectional view taken on the line 2—2 of Figure 1.

I have used the reference numeral 10 to indicate the frame of a farm tractor having side members 11 and an axle housing 12 at the rear end. Said axle housing supports at each end the traction wheels 13 which are of the ordinary construction. Said wheels 13 are spaced apart a distance equal to twice the distance between two rows of plants. The forward end of the frame is provided with a front member 14 supported by the steering wheels 15, which are closely mounted together to travel midway between two rows of plants.

By this arrangement it will be seen that the wheels 13 are designed to straddle two rows of plants.

Secured to each side of the front member 14 is a pair of laterally extending lugs 16. Secured to the front face of each set of lugs 16 is a vertical bar 17 having its ends provided with forwardly extending portions 18. Said portions 18 are inclined toward each other and designed to support a cross bar 19, which I shall term a draw bar. Each end of the draw bar 19 extends beyond the frame members 11 and terminates substantially in alinement with the tractor wheels 13. Brace members 20 are provided for connecting the draw bar with the member 17. The member 17 is detachably secured to the lugs 16 by suitable bolts 21.

Supported transversely across the top of the frame members 11 and in front of the tractor wheels 13 is a bar 22. A bar 23 is supported beneath the under side of the frame members 11 and beneath the bar 22, having its ends bent upwardly and secured to the outer ends of the bar 22 by bolts 24. Bolts 25 are passed through the bars 22 and 23 on opposite sides of the frame member 11 for clamping the members 22 and 23 in position.

Said bars 22 and 23 terminate a slight distance beyond the outside face of the wheels 13 and provide a frame for supporting the raising and lowering mechanism hereinafter described.

Secured to each end of the bar 19 is a clevis 26 to each of which is pivotally connected a tongue 27 of a corn planter 28. Said corn planters are of the ordinary construction and each have runners 29 and covering wheels 30. The centers of the planters are in alinement with the tractor wheels 13, so that the distance between the inner planter runners 29 of the two planters will be equal to the distance between the runners of each planter.

Each of the planters is provided with the usual check bars 31. The inner ends of said check bars are each provided with a universal joint 32 connected by a shaft 33 so that both check bars 31 may be operated in unison. The outer end of each of the check bars 31 is provided with the ordinary wire operated checking mechanism 34.

The rear ends of the frames 35 of the planters 28 are connected by means of a link 36, said link being connected by pivot members 37. By this arrangement it will be seen that the planters are free to independently follow the ground surface and at the same time are always supported substantially the same distance apart. The rear end of the frame 35 terminates a slight distance ahead of the tractor wheels 13 and below the outer ends of the frame member 22.

Each of the planters is provided with a lever 38 for the purpose of elevating and lowering the planter runners 29. Said elevating mechanism is of the usual construction, one form of which consists of a forwardly extending lever 39 rigidly connected to the lower end of the lever 38 and is provided with a downwardly extending link 40 pivotally connected to the rear end of the tongue 27, so that as the top end of the lever 38 is moved forwardly and rearwardly, the said runners will be elevated and lowered.

Referring to Figure 2 it will be seen that if the top end of the lever 38 is moved rearwardly, the rear end of the tongue 27 will be elevated, the forward end of the tongue being carried by the draw bar 19, which will cause the runners 29 to be elevated to the dotted line position with the frame member 35 inclined as shown by dotted lines. A portion of the weight of the planter rests on the wheels 30.

Mounted on each of the outer ends of the frame member 22 is a rock shaft 41 mounted in suitable bearings 42. The outer end of each of the rock shafts 41 is provided with a bell crank lever 43. The upper member of said lever 43 has a link 44 for connecting it with the lever 38. The lower member of the bell crank 43 has a chain 45 attached to the central portion of the rear end of the adjacent planter frame 35. Said chain has a considerable amount of slack when the planter is in its normal working position, as shown by solid lines in Figure 1.

The inner end of each of the rock shafts 41 is provided with an upwardly extending arm 46 having a series of openings 47 for adjustably and pivotally supporting a link 48 pivotally connected to a lever 49 mounted on a bracket 50. Said bracket 50 is secured to the axle housing 12 in the manner clearly illustrated in Figures 1 and 2. The lever 49 provides means whereby the operator of the tractor may raise or lower the planter runners, by the link and lever arrangement above described.

It will be seen that as the lever 49 is moved to the dotted line position shown in Figure 2, the shaft 41 will be rocked and the lever 43 elevated, and at the same time the rear end of the frame 35 will be lowered until the chain 45 has been tightened, after which further rearward movement of the lever 49 and further upward movement of the arm 43 will cause the rear end of the frame 35 to be elevated, carrying with it the planter wheels 30, so that the entire weight of the planters is carried by the frame members 19 and 22, which in turn are carried by the tractor frame.

Thus means is provided whereby the planter runners and wheels may be elevated above the ground surface to not interfere with the turning action of the tractor. It will readily be seen that inasmuch as the planter runners and wheels are supported between the front and rear wheels of the tractor, any turning movement of the tractor will impart lateral movement to said planter runners and wheels.

Each of the arms 43 and 46 are provided with a series of openings whereby the links 44 and 48 may be adjustably connected therewith, so that the device may be adapted to be connected to the various types of corn planters now on the market.

The rear end of each of the planter frames is provided with a pair of rearwardly extending bars 51, which are of such length as to engage the under face of the outer end of the frame member 22 when the rear ends of the planter frames are moved to their elevated positions, to prevent the planter from oscillating about its longitudinal central axis as the tractor is advanced over the ground surface.

The members 51 are supported below the ends of the frame member 22 to permit the planter to follow the uneven ground surface.

Thus it will be seen that I have provided an attachment which may be easily and quickly applied to certain types of farm tractors, and when so applied is adapted to simultaneously operate two corn planters and to permit the two planters to swing and move independently of each other to follow the ground surface, and provided in connection therewith a single lever mechanism for first elevating the runners of each of said planters, and upon further movement of the lever to elevate the entire planter above the ground surface; and further I have provided means whereby the operation of the checking device of one of the planters will simultaneously operate the checking device of the other planter.

I claim as my invention:

1. In combination, a tractor having at its forward end steering wheels adapted to travel between two rows of plants, and tractor wheels adapted to straddle two rows of plants, a draw bar detachably secured to the front end of said tractor frame, a corn planter hitched to each end of said draw bar, one on each side of said tractor frame and in front of the traction wheels, each of said planters having spaced runners, the distance between the inner runners of said planters being equal to the distance between the runners of one of said planters, means carried by said tractor for independently elevating and lowering the runners of either of said planters, and means for independently elevating and lowering the rear ends of either of said planters.

2. In combination, a tractor having at its forward end steering wheels adapted to travel between two rows of plants, and tractor wheels adapted to straddle two rows of plants, a draw bar detachably secured to the front end of said tractor frame, a corn planter hitched to each end of said draw bar, one on each side of said tractor frame and in front of the traction wheels, each of said planters having spaced runners, the distance between the inner runners of said planters being equal to the distance between the runners of one of said planters, and a single lever for raising and lowering each of said planters, the first movement of said lever being adapted to first elevate the planter runners, and further movement of the lever being adapted to elevate the entire planter frame.

3. In combination, a tractor frame, a draw bar secured to its forward end having its ends extending laterally beyond the sides of the tractor frame, a clevis carried by each end of said draw bar, a planter adjacent to each side of said tractor frame having its tongue pivotally connected to the outer end of said draw bar, each of said planters being provided with a dropping shaft and spaced runners, means for operatively connecting said dropping shafts, whereby the actuation of one of said shafts will simultaneously actuate the other, and a link for pivotally connecting the rear ends of said planters with the inner runners of said planter spaced apart a distance equal to the distance between the planter runners of one of said planters.

4. In combination, a tractor frame, a draw bar secured to its forward end having its ends extending laterally beyond the sides of the tractor frame, a planter adjacent to each side of said tractor frame having its tongue pivotally connected to the outer end of said draw bar, each of said planters being provided with a dropping shaft and spaced runners, means for operatively connecting said dropping shafts, whereby the actuation of one of said shafts will simultaneously actuate the other, a link for pivotally connecting the rear ends of said planters with the inner runners of said planter spaced apart a distance equal to the distance between the planter runners of one of said planters, each of said planters being provided with a lever device for elevating and lowering the runners of said planter, an auxiliary frame carried by said tractor frame, and lever arrangements carried by said tractor frame and said auxiliary frame for actuating the planter levers, whereby said planter runners will first be elevated above the ground surface, and upon further movement of the lever devices, the entire planter frame will be elevated.

5. In combination, a tractor frame, a draw bar having its ends extending laterally beyond said tractor frame, a corn planter adjacent to each side of said tractor frame, means for pivotally connecting the tongue of each of said planters to the corresponding end of said draw bar, each of said planters being provided with a lever device for elevating and lowering its runners, an auxiliary frame carried by said tractor frame, a rock shaft carried on each end of said auxiliary frame, a bell crank lever carried by each of said rock shafts, one end of each of said bell crank levers being connected to corresponding levers of said planters, the other end of each of said bell crank levers having a flexible lost motion means connecting the central portion of the rear end of each of said planter frames for elevating and lowering the same, each of said rock shafts also being provided with an arm, a link for each of said arms, and a lever for operating each of said links, said lever being adapted to move the planter lever to elevate its runners above the ground surface, and to tighten said lost motion flexible means, and further movement of said lever being adapted to elevate the entire planter frame.

6. In combination, a supporting frame including a draw bar, a corn planter having its tongue attached to said draw bar, said planter having runners, covering wheels back of said runners, a lever carried by said planter for elevating and lowering said runners while said wheels are on the ground surface, a lever carried by said supporting frame, means operatively connecting said levers for actuating said planter lever and for elevating said planter frame, the last said lever being adapted to first operate the planter lever and then to elevate the planter frame after the runners have been elevated.

7. In combination a supporting frame including a draw bar, a corn planter having its tongue attached to said draw bar, said planter having runners, covering wheels back of said runners, means carried by said supporting frame for elevating and lowering said planter, and independently operated means carried by said supporting frame for elevating said planter runners while the wheels are on the ground surface.

Des Moines, Iowa, June 22, 1929.

MIKE MILLER.